US009063385B2

(12) United States Patent
Hsueh et al.

(10) Patent No.: US 9,063,385 B2
(45) Date of Patent: Jun. 23, 2015

(54) DISPLAY PANEL

(75) Inventors: Fu-Yuan Hsueh, Chu-Nan (TW);
Tzu-Yu Cheng, Chu-Nan (TW)

(73) Assignee: INNOLUX CORPORATION, Miao-Li County (TW)

( * ) Notice: Subject to any disclaimer, the term of this patent is extended or adjusted under 35 U.S.C. 154(b) by 138 days.

(21) Appl. No.: 13/289,419

(22) Filed: Nov. 4, 2011

(65) Prior Publication Data
US 2012/0113364 A1 May 10, 2012

(30) Foreign Application Priority Data

Nov. 5, 2010 (TW) ................................. 99138219 A

(51) Int. Cl.
G02F 1/00 (2006.01)
G02F 1/1345 (2006.01)
G02F 1/1339 (2006.01)
G02F 1/1333 (2006.01)

(52) U.S. Cl.
CPC ............. *G02F 1/1345* (2013.01); *G02F 1/1339* (2013.01); *G02F 2001/133388* (2013.01); *G02F 2202/16* (2013.01); *G02F 2202/28* (2013.01)

(58) Field of Classification Search
CPC .................................................... G02F 1/00
USPC ................................................ 349/149, 106
See application file for complete search history.

(56) References Cited

U.S. PATENT DOCUMENTS 6,429,023 B1 * 8/2002 Gharavi ......................... 436/167
6,466,294 B1 * 10/2002 Yamagishi et al. ........... 349/155
7,583,350 B2 9/2009 Chang et al.
7,929,071 B2 * 4/2011 Hirano et al. .................... 349/49
8,026,905 B2 * 9/2011 Hamblin et al. .............. 345/173
8,134,652 B2 * 3/2012 Rho et al. ......................... 349/12
8,237,679 B2 * 8/2012 Jiang et al. ..................... 345/173
2002/0025391 A1 * 2/2002 Angelopoulos et al. ....... 428/1.4
2011/0234964 A1 * 9/2011 Moriwaki ...................... 349/149
2011/0297642 A1 * 12/2011 Allemand et al. ............... 216/13

FOREIGN PATENT DOCUMENTS

CN         1266199       9/2000
JP       2005070065      3/2005
TW        201005364      2/2010

OTHER PUBLICATIONS

Office Action dated Sep. 24, 2013 from corresponding application No. TW 099138219.
Office Action dated Dec. 19, 2013 from corresponding application No. CN 2010105393969.9.

* cited by examiner

*Primary Examiner* — Kaveh Kianni
(74) *Attorney, Agent, or Firm* — Rabin & Berdo, P.C.

(57) ABSTRACT

A display panel is provided. The display panel includes a first substrate and a second substrate. The second substrate comprises a center region, a first border region and a second border region. The center region has a first center region edge and a second center region edge. The center region corresponds to an active area for displaying an image of the display panel. The first border region, adjacent to the center region and located outside the first center region edge, has a first border region edge. The second border region, adjacent to the center region and located outside the second center region edge, has a second border region edge. The distance between the first center region edge and the first border region edge is larger than the distance between the second center region edge and the second border region edge.

10 Claims, 3 Drawing Sheets

DISPLAY PANEL

This application claims the benefit of Taiwan application Serial No. 99138219, filed Nov. 5, 2010, the subject matter of which is incorporated herein by reference.

BACKGROUND OF THE INVENTION

1. Field of the Invention

The disclosure relates in general to a display panel, and more particularly to a liquid crystal display panel.

2. Description of the Related Art

The conventional liquid crystal display device includes a backlight module and a liquid crystal display panel. In the liquid crystal display panel, the liquid crystal layer is disposed between a thin film transistor substrate and a color filter substrate. The conductive layer of the thin film transistor substrate and the conductive layer of the color filter substrate are electrically connected to each other by a conductive adhesive. For example, the common electrode of the color filter substrate and the conductive layer of the thin film transistor substrate used for receiving a common voltage are electrically connected to each other by a conductive adhesive, so that the common electrode and the conductive layer have the same level of common voltage. In general, the alignment layer disposed between the liquid crystal layer and the thin film transistor substrate and the alignment layer disposed between the liquid crystal layer and the color filter substrate are extended beyond the active area used for displaying a frame by the same length such as 0.55 mm.

One of the methods for miniaturizing the liquid crystal display panel is to reduce the widths of the border regions of the color filter substrate at each outer-lateral side of the active area. Since the alignment layer is extended beyond the active area by a fixed length, and the reserved width of the cutting path is also fixed, the alignment layer will be extended to a location between the conductive layer and the conductive adhesive, making the contact area between the conductive adhesive and conductive layer become smaller. When the quantity of the conductive particles of the conductive adhesive is limited, the conductive adhesive and the conductive layer will not be electrically conducted if the contact area is too small. Consequently, the conductive layer of the thin film transistor substrate and the conductive layer of the color filter substrate cannot be electrically conducted either. Thus, the common voltage of the color filter substrate and the thin film transistor substrate cannot be at equal potential, making the liquid crystal display unable to operate normally and will display an erroneous image instead.

SUMMARY OF THE INVENTION

The disclosure is directed to a display device capable of resolving the problem that the conductive adhesive and conductive layer cannot be electrically conducted when the width of the border region of the color filter substrate is reduced, so that the display device can operate normally to correctly display the image.

According to an aspect of the present disclosure, a display panel including a first substrate and a second substrate facing the first substrate is provided. A range of the second substrate is within a range of the first substrate. The second substrate comprises a center region, a first border region and a second border region. The center region has a first center region edge and a second center region edge opposite to the first center region edge. The center region corresponds to an active area used for displaying an image of the display panel. The first border region is adjacent to the center region and located outside the first center region edge. The first border region has a first border region edge opposite to the first center region edge. The second border region is adjacent to the center region and located outside the second center region edge. The second border region has a second border region edge opposite to the second center region edge. The distance between the first center region edge and the first border region edge is larger than the distance between the second center region edge and the second border region edge.

According to another aspect of the present disclosure, a display panel including a first substrate, a dielectric layer, a second substrate and a conductive adhesive is provided. The first substrate comprises a first conductive layer. The dielectric layer is disposed on the first substrate. The second substrate comprises a second conductive layer, a center region, a first border region and a second border region. The center region has a first center region edge and a second center region edge opposite to the first center region edge. The center region corresponds to an active area used for displaying an image of the display panel. The first border region is adjacent to the center region and located outside the first center region edge. The second border region is adjacent to the center region and located outside the second center region edge. The width of the first border region is larger than the width of the second border region. The conductive adhesive is disposed between the first conductive layer and the second conductive layer. In a part of the display panel corresponding to the first border region, the dielectric layer is not overlapped by the first conductive layer. In a part of the display panel corresponding to the second border region, the dielectric layer is overlapped by the first conductive layer partially.

The above and other aspects of the disclosure will become better understood with regard to the following detailed description of the preferred but non-limiting embodiment(s). The following description is made with reference to the accompanying drawings.

DETAILED DESCRIPTION OF THE INVENTION

Figure 1:
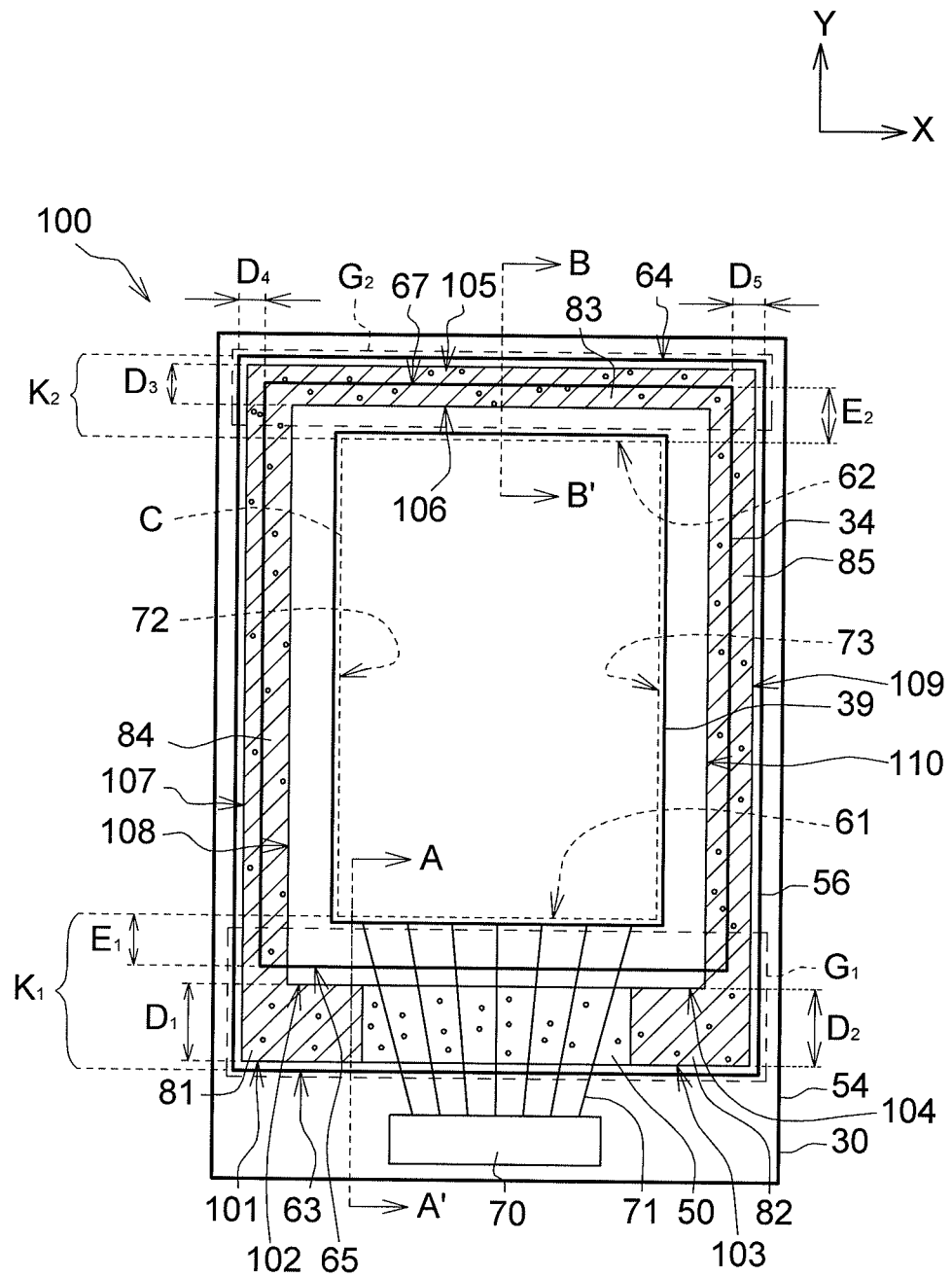
FIG. 1 shows a top view of a display panel according to an embodiment.
Figure 2:
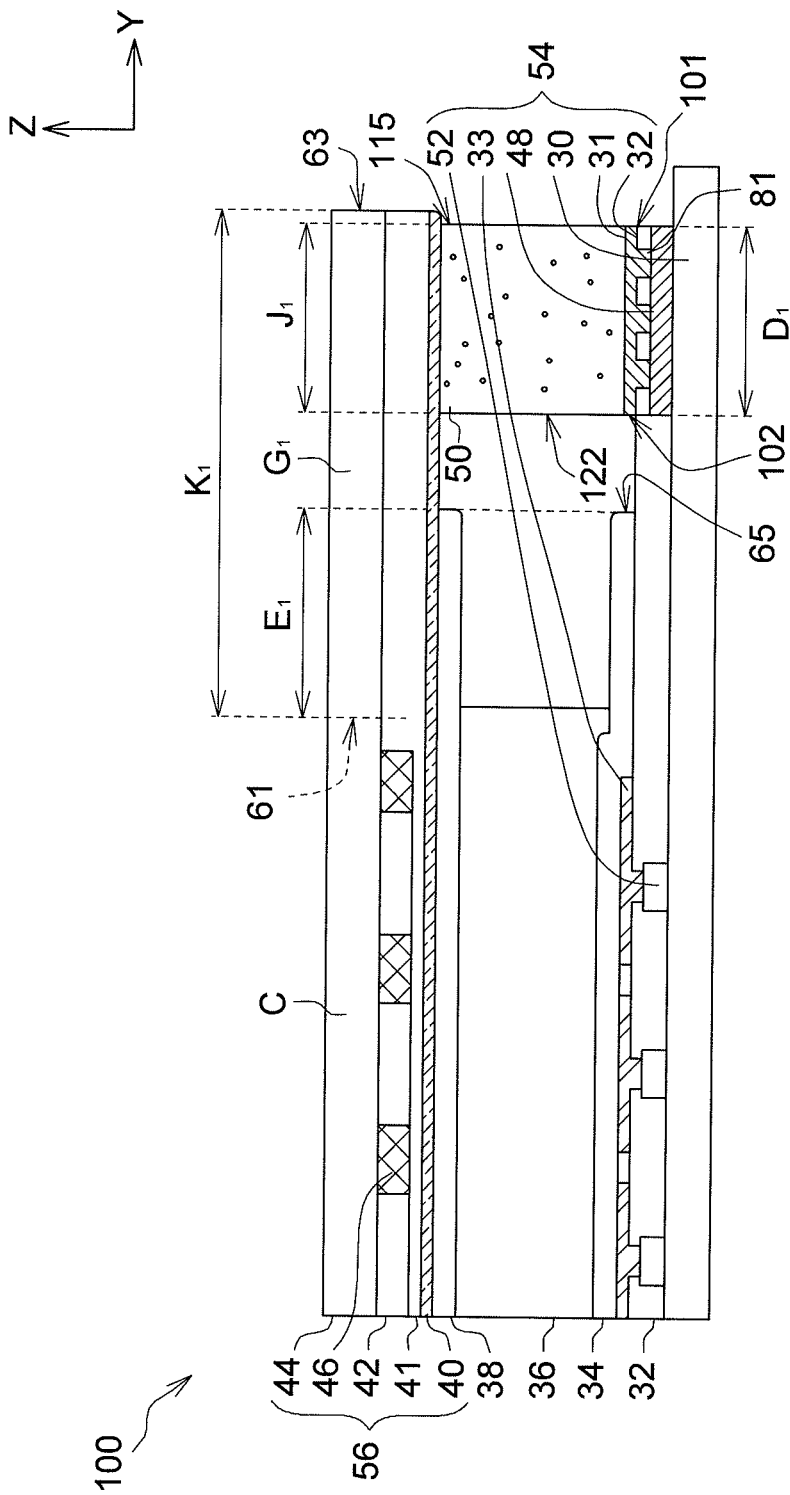
FIG. 2 shows a cross-sectional view of the display panel of FIG. 1 along a cross-sectional line AA'.
Figure 3:
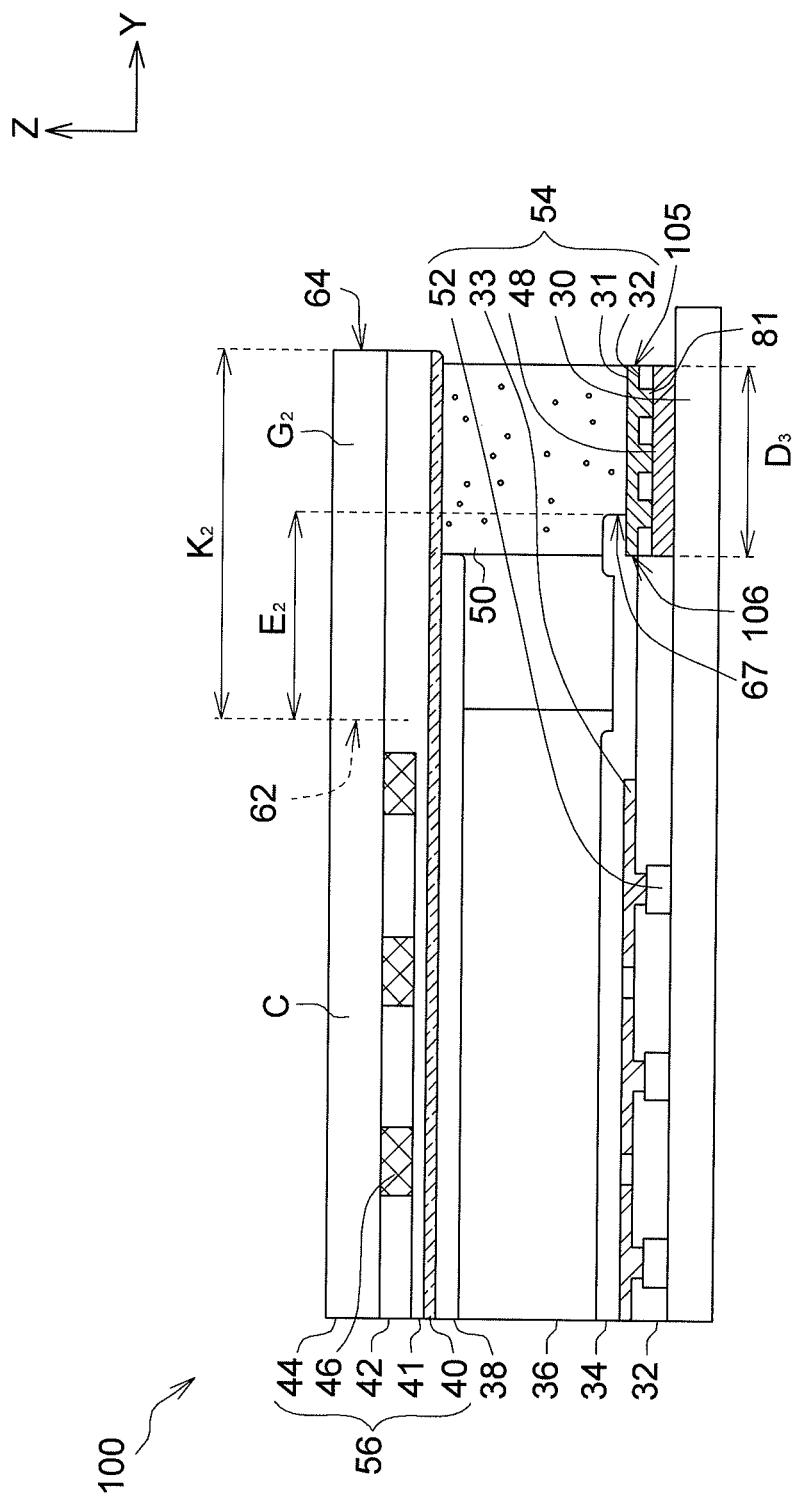
FIG. 3 shows a cross-sectional view of the display panel of FIG. 1 along a cross-sectional line BB'.

FIG. 1 shows a top view of a display panel according to an embodiment. FIG. 2 shows a cross-sectional view of the display panel of FIG. 1 along a cross-sectional line AA'. FIG. 3 shows a cross-sectional view of the display panel of FIG. 1 along a cross-sectional line BB'.

Referring to FIG. 2 and FIG. 3, a display panel 100 may be a liquid crystal display panel. The display panel 100 may comprise a liquid crystal layer 36 disposed between a first substrate 54 and a second substrate 56. The first substrate 54 may comprise a thin film transistor substrate. The first substrate 54 may comprise a base layer 30, a conductive layer 31, a protection layer 32, a conductive layer 48, a thin film transistor 52 and a pixel electrode 33. The second substrate 56 may comprise a color filter substrate. The second substrate 56 may comprise a base layer 44, a color filter 42, a light shielding element 46 (such as a black matrix), a protection layer 41 and a conductive layer 40 (such as a common electrode). For example, the base layer 30 and the base layer 44 can be glass.

For example, the color filter 42 comprises a red color filter, a green color filter and a blue color filter. The conductive layer 40, the conductive layer 31 and the pixel electrode 33 may be transparent electrodes, for example, made from indium tin oxide (ITO). For example, the material of the conductive layer 48 comprises a metal. The dielectric layer 34 and the dielectric layer 38 are disposed on the first substrate 54 and the second substrate 56 respectively. In an embodiment, the dielectric layer 34 and the dielectric layer 38 may comprise an alignment layer made from polyimide (PI). A conductive adhesive 50 is disposed between the first substrate 54 and the second substrate 56. For example, the conductive adhesive 50 may be a colloid mixed with conductive balls (such as gold balls). For example, the conductive layer 40 is used for receiving a common voltage, and the common voltage from the conductive layer 40 is received by the conductive layer 31 through the conductive adhesive 50.

Referring to FIG. 1, the range of the second substrate 56 can be within the range of the first substrate 54. The second substrate 56 may comprise a center region C and border regions adjacent to the center region C such as a first border region $G_1$ and a second border region $G_2$. The center region C corresponds to an active area 39 used for displaying an image of the display panel 100. The active area 39 comprises a plurality of pixel units each being driven by a corresponding driving chip. Let the liquid crystal display panel be taken for example. Each pixel unit is electrically connected to a source line and a gate line for receiving a driving signal provided by a gate driving chip and a pixel data provided by a source driving chip for displaying a corresponding image. Wherein, the source line is electrically connected to the source driving chip, and the gate line is electrically connected to the gate driving chip.

The center region C may comprise a first center region edge 61 and a second center region edge 62 which are substantially extended in the X direction, and a third center region edge 72 and a fourth center region edge 73 which are substantially extended in the Y direction. The first center region edge 61 and the second center region edge 62 are opposite to each other. The third center region edge 72 and the fourth center region edge 73 are opposite to each other and adjacent to the first center region edge 61 and the second center region edge 62. A first border region $G_1$ and a second border region $G_2$ are located outside the first center region edge 61 and the second center region edge 62 respectively. For example, the first center region edge 61 and the second center region edge 62 are a lower edge and an upper edge of the center region C respectively. The first border region $G_1$ and the second border region $G_2$ are a lower border region and an upper border region located underneath and above the center region C respectively.

The first border region $G_1$ further has a first border region edge 63 opposite to the first center region edge 61. The second border region $G_2$ further has a second border region edge 64 opposite to the second center region edge 62. In an embodiment, the distance $K_1$ between the first center region edge 61 and the first border region edge 63 along the Y direction is larger than the distance $K_2$ between the second center region edge 62 and the second border region edge 64 along the Y direction. The X direction and the Y direction are perpendicular to each other. In other words, the width of the first border region $G_1$ in the Y direction can be larger than the width of the second border region $G_2$ in the Y direction.

Besides, the first substrate 54 has a plurality of traces 71 electrically connected to a driving chip 70.

Referring to FIG. 1, in an embodiment, the conductive layer 31 may comprise a first conductive layer portion 81, a second conductive layer portion 82, a third conductive layer portion 83, a fourth conductive layer portion 84 and a fifth conductive layer portion 85. The first conductive layer portion 81 and the second conductive layer portion 82 are located outside the first center region edge 61. The first conductive layer portion 81 has a first conductive layer edge 101 and a second conductive layer edge 102 opposite to the first conductive layer edge 101 along a long side direction of the first conductive layer portion 81. The distance between the first conductive layer edge 101 and the second conductive layer edge 102 along the Y direction is defined as the first conductive layer distance $D_1$. The second conductive layer portion 82 has a third conductive layer edge 103 and a fourth conductive layer edge 104 opposite to the third conductive layer edge 103 along a long side direction of the second conductive layer portion 82. The distance between the third conductive layer edge 103 and the fourth conductive layer edge 104 along the Y direction is defined as the second conductive layer distance $D_2$. The third conductive layer portion 83 is located outside the second center region edge 62. The third conductive layer portion 83 has a fifth conductive layer edge 105 and a sixth conductive layer edge 106 opposite to the fifth conductive layer edge 105 along a long side direction of the third conductive layer portion 83. The distance between the fifth conductive layer edge 105 and the sixth conductive layer edge 106 along the Y direction is defined as the third conductive layer distance $D_3$. The fourth conductive layer portion 84 is located outside the third center region edge 72 and connected with the first conductive layer portion 81 and the third conductive layer portion 83. The fourth conductive layer portion 84 has a seventh conductive layer edge 107 and an eighth conductive layer edge 108 opposite to the seventh conductive layer edge 107 along a long side direction of the fourth conductive layer portion 84. The distance between the seventh conductive layer edge 107 and the eighth conductive layer edge 108 along the X direction is defined as the fourth conductive layer distance $D_4$. The fifth conductive layer portion 85 is located outside the fourth center region edge 73, and connected to the second conductive layer portion 82 and the third conductive layer portion 83. The fifth conductive layer portion 85 has a ninth conductive layer edge 109 and a tenth conductive layer edge 110 opposite to the ninth conductive layer edge 109 along a long side direction of the fifth conductive layer portion 85. The distance between the ninth conductive layer edge 109 and the tenth conductive layer edge 110 along the X direction is defined as the fifth conductive layer distance $D_5$. Referring to FIG. 1, the dielectric layer 34 has a first dielectric layer edge 65 and a second dielectric layer edge 67 opposite to the first dielectric layer edge 65. For example, the distance $E_1$ between the first dielectric layer edge 65 of the dielectric layer 34 and the first center region edge 61 along the Y direction in the part of the display panel 100 (FIG. 2) corresponding to the first border region $G_1$ is substantially equal to the distance $E_2$ between the second dielectric layer edge 67 of the dielectric layer 34 and the second center region edge 62 along the Y direction in the part of the display panel 100 (FIG. 3) corresponding to the second border region $G_2$. For example, the distance $E_1$ and the distance $E_2$ are both 0.55 mm. In the present embodiment of the disclosure, the dielectric layer 34 and the dielectric layer 38 are extended beyond every edge (such as the first center region edge 61, the second center region edge 62, the third center region edge 72 and the fourth center region edge 73) of the active area (that is, the center region C) by substantially the same length.

Referring to FIG. 1 and FIG. 3, the second border region $G_2$ which has a smaller width along the Y direction helps to reduce the dimension of the display panel 100. In the second border region $G_2$, due to the area restriction, the conductive layer 31 is overlapped by the dielectric layer 34 partially, so that the contact area between the conductive layer 31 and the conductive adhesive 50 becomes small. The reduction in contact area may easily lead to poor electrical conduction. In an embodiment, the structure of display panel 100 in the border region outside the third center region edge 72 and the fourth center region edge 73 of the center region C is similar to the structure in the second border region $G_2$, and the similarities are not repeated here.

Referring to FIG. 1 and FIG. 2, in an embodiment of the disclosure, the width of the first border region $G_1$ along the Y direction (that is, the distance $K_1$) is larger than the width of the second border region $G_2$ along the Y direction (that is, the distance $K_2$). Thus, in the part of the display panel 100 corresponding to the first border region $G_1$, the first conductive layer portion 81 of the conductive layer 31 is not overlapped by the dielectric layer 34 (as indicated in FIG. 2), so that the conductive adhesive 50 is overlapped by the first conductive layer portion 81 substantially, the totality of the first conductive layer portion 81 contacts with the conductive adhesive 50, and therefore the conduction effect between the conductive layer 31 and the conductive adhesive 50 will not be affected. In the present embodiment of the disclosure, the second conductive layer portion 82 of the conductive layer 31 is also not overlapped by the dielectric layer 34 (as indicated in FIG. 1), so that the conductive adhesive 50 is overlapped by the second conductive layer portion 82 substantially, and the totality of the second conductive layer portion 82 contacts with the conductive adhesive 50. Moreover, since the first border region $G_1$ having a large width along the Y direction can provide an addition space, the width of the conductive layer 31 along the Y direction can be adjusted to control the conduction effect between the conductive layer 31 and the conductive adhesive 50. For example, the poor electrical conduction between the conductive layer 31 and the conductive adhesive 50 in the border regions other than the first border region $G_1$ can be offset by adjusting the first conductive layer distance $D_1$ of the first conductive layer portion 81 and the second conductive layer distance $D_2$ of the second conductive layer portion 82 in the conductive layer 31 corresponding to the first border region $G_1$ to be larger than the third conductive layer distance $D_3$ of the third conductive layer portion 83 in the conductive layer 31 corresponding to the second border region $G_2$, and increasing the contact area between the conductive layer 31 and the conductive adhesive 50 in the first border region $G_1$. Likewise, the first conductive layer distance $D_1$ and the second conductive layer distance $D_2$ along the Y direction can also be larger than the fourth conductive layer distance $D_4$ and the fifth conductive layer distance $D_5$ along the X direction.

Besides, the first border region $G_1$ of the second substrate 56 has a larger width along the Y direction implies that the exposed part of the first substrate 54 not shielded by the second substrate 56 becomes small. Thus, the outer lead bonding (OLB) region, that is, the exposed part of the first substrate 54 not shielded by the second substrate 56 can sustain higher stress, and the panel damage rate during the process of bonding a integrated circuit and a flexible circuit board is decreased.

Referring to FIG. 2, for example, in the part of the display panel 100 corresponding to the first border region $G_1$, the conductive adhesive 50 may have a first conductive adhesive edge 115 and a second conductive adhesive edge 122 opposite to the first conductive adhesive edge 115. The first conductive adhesive edge 115 and the second conductive adhesive edge 122 have a conductive adhesive distance $J_1$ therebetween along the Y direction. Preferably, the first conductive layer distance $D_1$ along the Y direction may be smaller than or equal to the conductive adhesive distance $J_1$ along the Y direction, so as to produce best conduction effect between the conductive layer 31 and the conductive adhesive 50. Moreover, the first conductive layer edge 101 may be substantially aligned with the first conductive adhesive edge 115 or located between the first conductive adhesive edge 115 and the second conductive adhesive edge 116, so that the conductive layer 31 is protected by the conductive adhesive 50 and will not be oxidized or damaged.

Referring to FIG. 1, the first conductive layer portion 81 and the second conductive layer portion 82 are disposed in the space outside the traces 71. The space at the two sides of the traces 71 can be utilized to increase the width of the first conductive layer portion 81 (or the second conductive layer portion 82) along the Y direction. Thus, the contact area between the conductive layer 31 and the conductive adhesive 50 can be increased without increasing the area of the first substrate 54, so that the conduction effect between the conductive layer 31 and the conductive adhesive 50 is improved.

In an embodiment of the disclosure, the substrate of the display panel has several border regions with different widths. The border region with smaller width can help to reduce the dimension of the display panel. In the border region with larger width, the conductive layer can be separated from the dielectric layer, and the shape of the conductive layer can be appropriately changed so as to compensate the poor conduction effect which occurs in the border region with smaller width. The border region with larger width decreases the unshielded portion of the display panel, hence enhancing the structure strength of the display panel. The portion of the conductive layer with larger width is disposed in the space outside the traces, and utilizes the space of the display panel without increasing the required substrate space. According to the conventional method, the conductive adhesive and the conductive layer cannot be electrically conducted when the width of the border region of the substrate is reduced. The present embodiment of the disclosure resolves the problem of electrical isolation between the conductive adhesive and the conductive layer, so that the liquid crystal display of the present embodiment of the disclosure can operate normally to correctly display the image.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
  a first substrate comprising a first conductive layer;
  a dielectric layer disposed on the first substrate; and
  a second substrate facing the first substrate, wherein a range of the second substrate is within a range of the first substrate and, the second substrate further comprises:
    a center region having a first center region edge, a second center region edge, a third center region edge and a fourth center region edge, and corresponding to an active area used for displaying an image of the display panel, wherein the second center region edge is opposite to the first center region edge, the third center region edge and the fourth center region edge are opposite to each other and adjacent to the first center region edge and the second center region edge;

a first border region adjacent to the center region and located outside the first center region edge, wherein the first border region has a first border region edge opposite to the first center region edge; and a second border region adjacent to the center region and located outside the second center region edge, wherein the second border region has a second border region edge opposite to the second center region edge;

wherein, a distance between the first center region edge and the first border region edge is larger than a distance between the second center region edge and the second border region edge;

the first conductive layer comprising:

a first conductive layer portion located outside the first center region edge, wherein the first conductive layer portion has a first conductive layer edge and a second conductive layer edge opposite to the first conductive layer edge along a long side direction of the first conductive layer portion, the first conductive layer edge and the second conductive layer edge having a first conductive layer distance therebetween;

a second conductive layer portion located outside the first center region edge, wherein the second conductive layer portion has a third conductive layer edge and a fourth conductive layer edge opposite to the third conductive layer edge along a long side direction of the second conductive layer portion, the third conductive layer edge and the fourth conductive layer edge having a second conductive layer distance therebetween;

a third conductive layer portion located outside the second center region edge, wherein the third conductive layer portion has a fifth conductive layer edge and a sixth conductive layer edge opposite to the fifth conductive layer edge along a long side direction of the third conductive layer portion, the fifth conductive layer edge and the sixth conductive layer edge having a third conductive layer distance therebetween;

a fourth conductive layer portion located outside the third center region edge and connected with the first conductive layer portion and the third conductive layer portion, wherein the fourth conductive layer portion has a seventh conductive layer edge and an eighth conductive layer edge opposite to the seventh conductive layer edge along a long side direction of the fourth conductive layer portion, the seventh conductive layer edge and the eighth conductive layer edge having a fourth conductive layer distance therebetween; and a fifth conductive layer portion located outside the fourth center region edge and connected with the second conductive layer portion and the third conductive layer portion, wherein the fifth conductive layer portion has a ninth conductive layer edge and a tenth conductive layer edge opposite to the ninth conductive layer edge along a long side direction of the fifth conductive layer portion, the ninth conductive layer edge and the tenth conductive layer edge having a fifth conductive layer distance therebetween;

wherein, the first conductive layer distance and the second conductive layer distance are larger than the third conductive layer distance, the fourth conductive layer distance and the fifth conductive layer distance, and wherein, the dielectric layer is overlapped by the third conductive layer portion to the fifth conductive layer portion partially, and the dielectric layer is not overlapped by the first conductive layer portion and the second conductive layer portion.

2. The display panel according to claim 1, wherein the first substrate comprises a first conductive layer, the second substrate comprises a second conductive layer, and the display panel further comprises:

a conductive adhesive disposed between the first conductive layer and the second conductive layer;

wherein, in a part of the display panel corresponding to the first border region, the dielectric layer is not overlapped by the first conductive layer.

3. The display panel according to claim 2, wherein the second conductive layer is for receiving a common voltage, and the common voltage is received by the first conductive layer through the conductive adhesive.

4. The display panel according to claim 2, wherein in a part of the display panel corresponding to the second border region, the dielectric layer is overlapped by the first conductive layer partially.

5. The display panel according to claim 4, wherein the dielectric layer has a first dielectric layer edge and a second dielectric layer edge opposite to the first dielectric layer edge, and a distance between the first dielectric layer edge and the first center region edge in a part of the display panel corresponding to the first border region is equal to a distance between the second dielectric layer edge and the second center region edge in a part of the display panel corresponding to the second border region.

6. The display panel according to claim 2, wherein in a part of the display panel corresponding to the first border region, the first conductive layer has a first conductive layer edge and a second conductive layer edge opposite to the first conductive layer edge, the first conductive layer edge and the second conductive layer edge have a first conductive layer distance therebetween, the conductive adhesive has a first conductive adhesive edge and a second conductive adhesive edge opposite to the first conductive adhesive edge, the first conductive adhesive edge and the second conductive adhesive edge have a conductive adhesive distance therebetween, the first conductive layer distance is smaller than or equal to the conductive adhesive distance, and the first conductive layer edge is substantially aligned with the first conductive adhesive edge or between the first conductive adhesive edge and the second conductive adhesive edge.

7. The display panel according to claim 2, wherein the display panel is a liquid crystal display panel, the display panel further comprises a liquid crystal layer disposed between the first substrate and the second substrate, the first substrate comprises a thin film transistor substrate, a second substrate comprises a color filter substrate, and the dielectric layer comprises an alignment layer.

8. The display panel according to claim 1, wherein the first substrate has a plurality of traces which are electrically connected to a driving chip and disposed between the first conductive layer portion and the second conductive layer portion.

9. The display panel according to claim 1, wherein the conductive adhesive is overlapped by the first conductive layer portion and the second conductive layer portion.

10. The display panel according to claim 1, wherein from a top view of the second substrate, the distance between the first center region edge and the first border region edge is larger than the distance between the second center region edge and the second border region edge.

* * * * *